US012072085B2

(12) United States Patent
Kessels et al.

(10) Patent No.: US 12,072,085 B2
(45) Date of Patent: Aug. 27, 2024

(54) LIGHTING DEVICE FOR MOUNTING TO AN OPTICAL ELEMENT HAVING A MOUNTING RING, HEAT SINK WITH A HOLLOW STRUCTURE AND FAN

(71) Applicant: LUMILEDS LLC, San Jose, CA (US)

(72) Inventors: Marcus Jozef Henricus Kessels, Echt (NL); Matthias Epmeier, Aachen (DE); Frank Giese, Aachen (DE); Floris Maria Hermansz Crompvoets, Bunde (NL)

(73) Assignee: LUMILEDS, LLC, San Jose, CA (US)

( * ) Notice: Subject to any disclaimer, the term of this patent is extended or adjusted under 35 U.S.C. 154(b) by 0 days.

(21) Appl. No.: 18/018,217

(22) PCT Filed: Jul. 28, 2021

(86) PCT No.: PCT/US2021/043560
§ 371 (c)(1),
(2) Date: Jan. 26, 2023

(87) PCT Pub. No.: WO2022/026615
PCT Pub. Date: Feb. 3, 2022

(65) Prior Publication Data

US 2023/0272903 A1 Aug. 31, 2023

(30) Foreign Application Priority Data

Jul. 28, 2020 (EP) .................................... 20188125

(51) Int. Cl.
*F21V 29/74* (2015.01)
*F21K 9/237* (2016.01)
(Continued)

(52) U.S. Cl.
CPC ............ *F21V 29/745* (2015.01); *F21K 9/237* (2016.08); *F21K 9/238* (2016.08); *F21V 29/83* (2015.01)

(58) Field of Classification Search
CPC ...... F21V 29/67; F21V 29/673; F21V 29/677; F21V 29/70; F21V 29/71; F21V 29/713;
(Continued)

(56) References Cited

U.S. PATENT DOCUMENTS 8,066,414 B2 * 11/2011 Pabst ...................... F21V 29/67
362/345
10,036,519 B2 * 7/2018 Moon ..................... F21K 9/233
(Continued)

FOREIGN PATENT DOCUMENTS

CN 207438477 U 6/2018
CN 109654452 A 4/2019
(Continued)

OTHER PUBLICATIONS

International Search Report and Written Opinion dated Nov. 8, 2021 for PCT International Application No. PCT/US2021/043560.
(Continued)

*Primary Examiner* — Robert J May
(74) *Attorney, Agent, or Firm* — Volpe Koenig

(57) ABSTRACT

A lighting device for mounting to an optical element includes a center ring, a heat sink, at least one housing part and at least one fan. The center ring has a first side and a second side and includes a mechanical interface for mechanically coupling the center ring to the optical element. The heat sink includes a lighting module mounting part for connection with at least one relative to the center ring with the entire at least one hollow structure over the first side of the lighting module and at least one hollow structure within the heat sink. The heat sink is positioned center ring. The at
(Continued)

least one fan includes at least one blade and a driver. At least a portion of the at least one fan is contained within the at least one housing part with the at least one blade within the at least one hollow structure.

18 Claims, 6 Drawing Sheets

(51) Int. Cl.
*F21K 9/238* (2016.01)
*F21V 29/83* (2015.01)

(58) Field of Classification Search
CPC ........ F21V 29/74; F21V 29/745; F21V 29/75; F21V 29/76; F21V 29/763; F21V 29/767; F21V 29/77; F21V 29/773; F21V 29/777; F21V 29/83; F21V 29/78
See application file for complete search history.

(56) References Cited

U.S. PATENT DOCUMENTS

| | | | | |
|---|---|---|---|---|
| 2012/0033419 | A1* | 2/2012 | Kim | F21V 29/505 362/294 |
| 2012/0188780 | A1* | 7/2012 | Wilk | F21V 29/763 362/183 |
| 2013/0176726 | A1* | 7/2013 | Yang | F21V 29/83 362/382 |
| 2017/0248303 | A1 | 8/2017 | Hardgrave | |
| 2018/0255622 | A1 | 9/2018 | Spero | |
| 2019/0211991 | A1 | 7/2019 | Lessard et al. | |
| 2020/0084889 | A1 | 3/2020 | Epmeier et al. | |

FOREIGN PATENT DOCUMENTS

| | | | |
|---|---|---|---|
| DE | 202020101383 | U1 | 3/2020 |
| JP | 3195848 | U | 2/2015 |
| KR | 20160101381 | A | 8/2016 |
| KR | 10-1683624 | B1 | 12/2016 |
| KR | 10-1852793 | B1 | 6/2018 |
| WO | 2019177317 | A1 | 9/2019 |

OTHER PUBLICATIONS

Extended European Search Report dated Jan. 21, 2021 for European Patent Application No. 20188125.7.

* cited by examiner

LIGHTING DEVICE FOR MOUNTING TO AN OPTICAL ELEMENT HAVING A MOUNTING RING, HEAT SINK WITH A HOLLOW STRUCTURE AND FAN

CROSS REFERENCE TO RELATED APPLICATIONS

This application is a § 371 application of International Application No. PCT/US2021/043560, filed Jul. 28, 2021, which claims priority to European Patent Application No. 20188125.7, filed on Jul. 28, 2020, the contents of which are hereby incorporated by reference herein.

BACKGROUND

Modern lighting devices used as automotive lights (e.g., automotive head lamps) usually comprise a heat sink. A lighting module or light emitting device (e.g., a light emitting diode (LED)) may be attached to the heat sink so that the heat from operating the lighting module can safely be dissipated away without inflicting damage to the lighting module. The lighting module attached to the heat sink may be connected to an electrical interface via electrical lines so that the lighting module can be externally controlled, such as switched on or off.

SUMMARY

A lighting device for mounting to an optical element includes a center ring, a heat sink, at least one housing part and at least one fan. The center ring has a first side and a second side and includes a mechanical interface for mechanically coupling the center ring to the optical element. The heat sink includes a lighting module mounting part for connection with at least one lighting module and at least one hollow structure within the heat sink. The heat sink is positioned relative to the center ring with the entire at least one hollow structure over the first side of the center ring. The at least one fan includes at least one blade and a driver. At least a portion of the at least one fan is contained within the at least one housing part with the at least one blade within the at least one hollow structure.

BRIEF DESCRIPTION OF THE DRAWINGS

A more detailed understanding can be had from the following description, given by way of example in conjunction with the accompanying drawings wherein:

FIG. 10 is a diagram of a halogen lamp pendant;

DETAILED DESCRIPTION

Figures 1A, 1B, 1C:
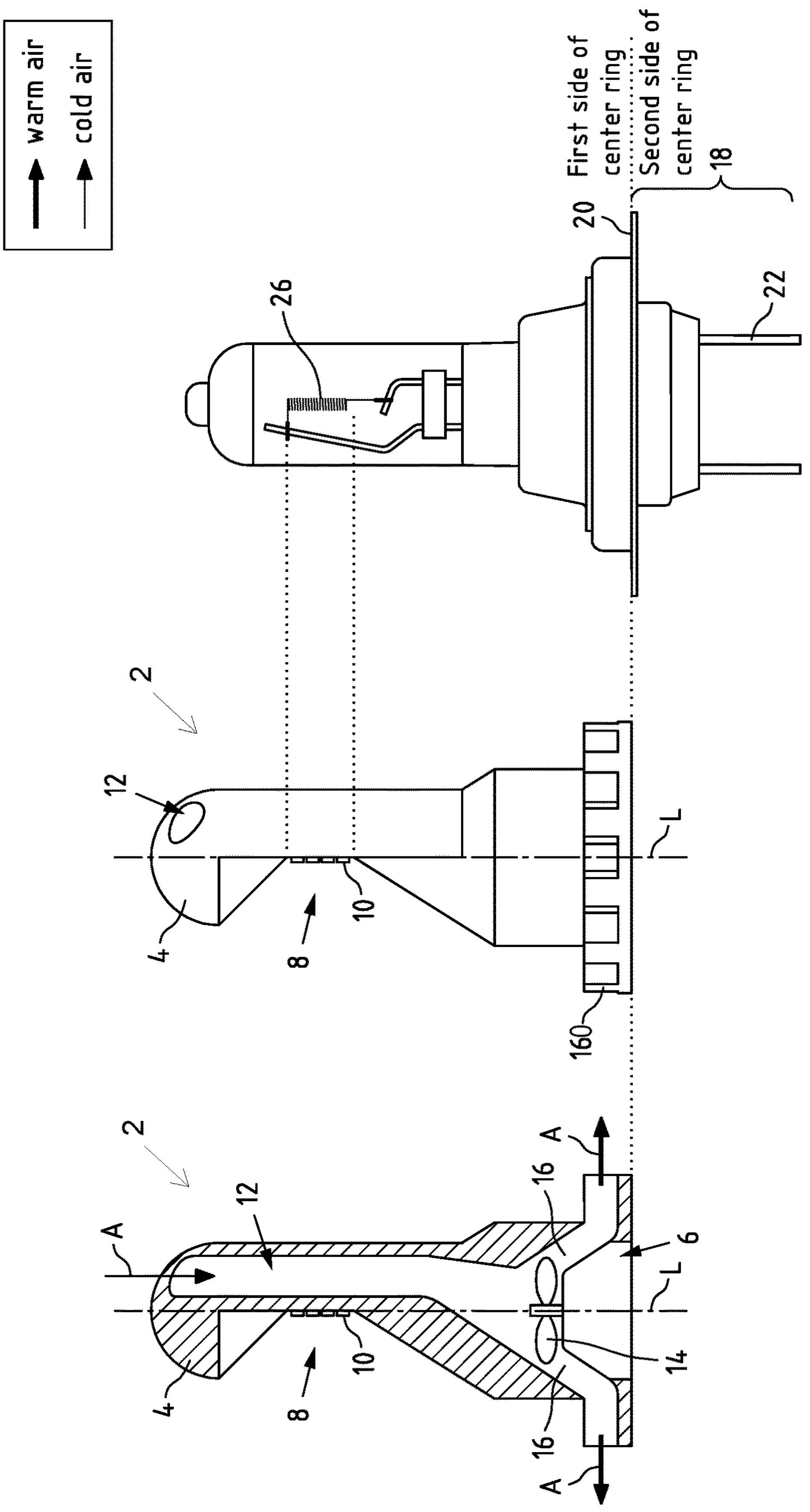
FIG. 1A is a cross-sectional view of example lighting device.
FIG. 1B is a schematic view of the example lighting device of FIG. 1A.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

Halogen lamps have been the default light source for many years for automotive head lighting. However, recent advances in LED technology with concomitant new design possibilities and energy efficiency has spurred interest in finding a legal replacement for halogen that is based on LED technology, so-called LED retrofits. Such LED retrofits have been on the market for a couple of years and are a popular aftermarket replacement for halogen head lamps. However, almost all of these retrofits do not fulfil the legal requirements and hence are not allowed on the road.

In retrofit applications of such lighting devices, such as. lighting bulbs for automotive appliances, a compliant light beam pattern and mechanical fit needs to be achieved. To ensure a compliant light beam, efficient and compact lighting modules may be used. To dissipate the heat generated during the operation of the lighting device, appropriate cooling has to be provided to ensure good performance of the lighting device.

Retrofits or retrofit lighting devices should optically mimic the properties of their halogen lamp pendants to deliver good performance. One difficulty is to stay within the mechanical boundaries and still provide good thermal management. This may be especially critical for fitting in automotive head lamps where the needed power is high and hence additional cooling means (e.g., a fan) are commonly installed on the back of the retrofit. Such a fan normally uses much more space than the original halogen bulb, and, hence, the retrofit does not fit inside of the lamp housing so that the fan is arranged outside of the lamp housing. It may be disadvantageous that current retrofits use much space and often do not fit in many car head lamps.

Mounting LEDs on a metal heat sink is a common way to cool LEDs. In a typical LED retrofit in a head lamp, the main heat transport mechanism may comprise heat conduction through an LED, solder, a printed circuit board (PCB) and/or a lead frame and the heat sink. With a fan, this may enable forced convection from the heat sink surface to the air volume inside the automotive head lamp. This may differ from halogen lamps, which may exhibit heat transfer via thermal radiation so that additional components, such as a heat sink, may not be necessary. These additional components may also need significant space in the automotive head lamp and, thus, part of the lighting device may need to be located outside of an automotive head lamp (e.g., outside of the reflector housing). Embodiments described herein provide for a lighting device and a method for producing such a lighting device that mimic conventional halogen lamp pendants in their outer form and have sufficient cooling.

FIG. 1A is a cross-sectional view of example lighting device 2. In the example illustrated in FIG. 1A, the lighting device 2 includes a hollow structure 12, such as a cooling pipe, a fan 14, and a lighting module mounting portion 8. In embodiments, the hollow structure 12 extends along the longitudinal direction L of the lighting device 2. The fan 14 may be disposed in the hollow structure 12 of the lighting device 2, enabling a heat exchange between the heat sink 4 and an ambient surrounding of the lighting device 2. The fan 14 may be connected with the hollow structure 12 in such a way that an air flow A through the hollow structure 12 may be enabled by operating the fan 14.

The fan 14 may comprise one or more blades and means to drive the (e.g., rotate) the one or more blades. A housing for the fan 14 may be provided by the housing part 6 (or a fan housing part) of the heat sink 4. Thus, the at least one fan itself may not comprise a housing. Such a housing part may comprise additional components. The housing part may also be a part of the hollow structure or, for example, one or more air channels, such as cooling pipes, to name but one non-limiting example. In case the housing part may form the housing (e.g., solely) for the at least one fan, the housing part may also be referred to as fan housing part. Thus, the at least one fan may be comprised by the at least one housing part. The at least one fan may be comprised by the at least one housing part by, for example, mounting it to or integrating it into the housing part of the lighting device, such as by gluing, welding, riveting, or a combination thereof.

The at least one fan may be arranged (e.g., mounted) in or at the housing part of the lighting device. The at least one fan may comprise or be made from plastic, metal, a rigid material, or a combination thereof. The at least one fan may be a radial or an axial fan. Alternatively, or additionally, the fan may comprise a plurality of (e.g., at least two) vanes or blades, as described above. The plurality of vanes or blades may be shaped in such a way that the plurality of vanes or blades may enable (e.g., act as) a centrifugal fan. The housing part of the lighting device, when the lighting device is mounted to a socket of an optical element (e.g., an automotive head lamp), may still be located within a reflector representing the optical element of the automotive head lamp. This may enable the lighting device according to the embodiments described herein to mimic a halogen lamp pendant and also fit in the automotive head lamp. The at least one fan may be configured to have a volume flow sufficient to dissipate heat generated by the at least one lighting module away from the heat sink. The at least one fan may be arranged within the housing part of the lighting device. For instance, the housing part may have a certain size adapted to the fan, such as the size of the vane(s) or blade(s) of the fan. The housing part may at least partially be hollow, enabling to arrange the at least one fan within the housing part. In case the fan is arranged within the housing part, the at least one hollow structure may be arranged in such a way enabling the fan to blow or suck air out of or into the hollow structure.

Alternatively, the at least one fan may be arranged in between the housing part and the at least one lighting module mounting portion of the first side of the center ring. In this case, the fan may be arranged in such a way in relation to the hollow structure so that the fan can blow air into or out of the hollow structure.

According to some embodiments, the at least one housing part may be positioned on the first side of the center ring or on a second side of the center ring opposite to the first side of the center ring. In the first case, the housing part may be a fan housing part of the lighting device. The housing part may provide a housing for the fan. The fan that is, for example, attached to or integrated into the heat sink may be represented by a motor and the blades of the fan. The lighting module mounting portion, the hollow structure, and/or the (e.g., fan) housing part may be integrally formed into or being part of the heat sink.

The fan can be below (e.g., second side) or above (e.g., first side) the center ring if the lighting device is vertically arranged. Of course, a first fan can be arranged on the first side of the center ring, and another fan can be arranged on the second side of the center ring at the same time. A corresponding embodiment is described in the detailed description of this specification.

The optical element may, for instance, be a reflector or a lens, such as of an automotive appliance. The heat sink or the lighting device may provide or comprise mounting means enabling the optical element to be mounted to the heat sink or the lighting device. The optical element may include a mechanical interface corresponding to the mounting means of the heat sink or the lighting device for connecting the optical element to the heat sink or the lighting device.

The air flow A may move air from the intake of the hollow structure 12 shown at the top of FIG. 1*a* to the output of the fan 14 shown on the bottom of FIG. 1A. The fan 14 may be arranged so that the fan 14 may suck air into the hollow structure 12 and blow air out of the hollow structure 12. The realized air flow A can also be in the opposite direction than it is shown in FIG. 1A. In embodiments, the fan 14 may be an axial fan. The air flow A may be redirected by the shape of the hollow structure 12 that is bent by approximately 90.

The hollow structure 12 may be located near the lighting module mounting portion 8 to be at least thermally coupled with a lighting module 10 (not shown in FIG. 1A). Heat generated by such a lighting module 10 may heat the heat sink 4. Then, the air flow A may be sucked in as cold air is warmed and the warm air can be dissipated away via the air flow A.

A heat sink may be understood as a passive heat exchanger that transfers the heat generated by a lighting module, such as an LED unit or module comprising at least one LED die, such as two, three, or more LED dies, to a gaseous or fluid medium, such as environmental air, so that heat may flow or be dissipated away from the lighting module. Thermally, such a heat sink may fulfil the function of heat spreading of high local fluxes in a light source region and/or may provide a large surface to the surrounding fluid or gaseous medium (e.g., environmental air). A heat sink may thereby allow regulation of the lighting module's temperature at optimal levels. The heat sink may be made from a thermally conductive material, for example a metallic material such as sheet metal. In some embodiments, the heat sink may comprise or consist of aluminum, copper, and/or aluminum and/or copper based alloys.

FIG. 1B is a schematic view of the example lighting device 2 of FIG. 1A. In the example illustrated in FIG. 1B, it can be seen that a plurality of cooling fins 160 are attached to the output where the fan 14 blows the warm air out. The cooling fins 160 may surround the hollow structure 12, for example at one end of the hollow structure 12. This end may be the outlet of the hollow structure 12 where warm air is output. The cooling fins 160 may enable to cool the output air enabling a heat exchange of the warm/hot air moving out of the hollow structure 12.

According to some embodiments, one or more cooling fins may be on the first side of the center ring, and the at least one fan may be arranged on the second side of the center ring. According to other embodiments, one or more cooling fins may be on the second side of the center ring, and the at least one fan may be arranged on the first side of the center ring. According to another exemplary embodiment, one or more cooling fins and the at least one fan may be arranged on the first side of the center ring. In this case, the at least one fan may suck in air from within an automotive appliance (e.g., automotive head lamp) when the lighting device is mounted to such an automotive appliance. According to another exemplary embodiment, at least one fan may be arranged on the first side of the center ring, and at least one other fan may be arranged on the second side of the center ring, wherein the at least one fan and the at least one other fan may be connected via at least one drive shaft connected to a motor. The at least one drive shaft may be a single drive shaft so that one motor can drive the at least one fan and the at least one other fan simultaneously.

According to some embodiments, the at least one hollow structure may be surrounded by one or more cooling fins, wherein air of the air flow may be transferred by the at least one fan to the one or more cooling fins so that heat generated by the at least one lighting module may be transferred to an ambient surrounding of the heat sink. The ambient surrounding may be inside of an automotive appliance in case the lighting device is mounted to such an automotive appliance (e.g., automotive head lamp). The cooling fins may be either on the first side or the second side of the center ring. The cooling fins may be arranged at an outlet opening of the hollow structure. By arranging the one or more cooling fins in this way, the one or more cooling fins may surround the hollow structure.

FIG. 1C is a diagram of a halogen lamp pendant. As the lighting device 2 of FIGS. 1A and 1B are retrofit lamps and, for example, intended to mimic the halogen lamp pendant of FIG. 1C, such lighting devices 2 may include some of the same components as the halogen lamp pendant of FIG. 1C, such as a connection portion 18 and/or contact pins 22 (although not shown in FIGS. 1A and 1B). As can be seen from FIGS. 1A, 1B and 10, the lighting device 2 of FIGS. 1A and 1B fits in the same space available inside of an automotive head lamp for the halogen lamp pendant. In particular, a lighting module 10 shown mounted on the mounting portion 8 in FIG. 1B may be aligned in the same position as the filament 26 of the halogen lamp pendant, as is indicated by the two dotted lines extending from the halogen filament 26 of FIG. 1C to the lighting module 10 of FIG. 1B.

Figure 2:
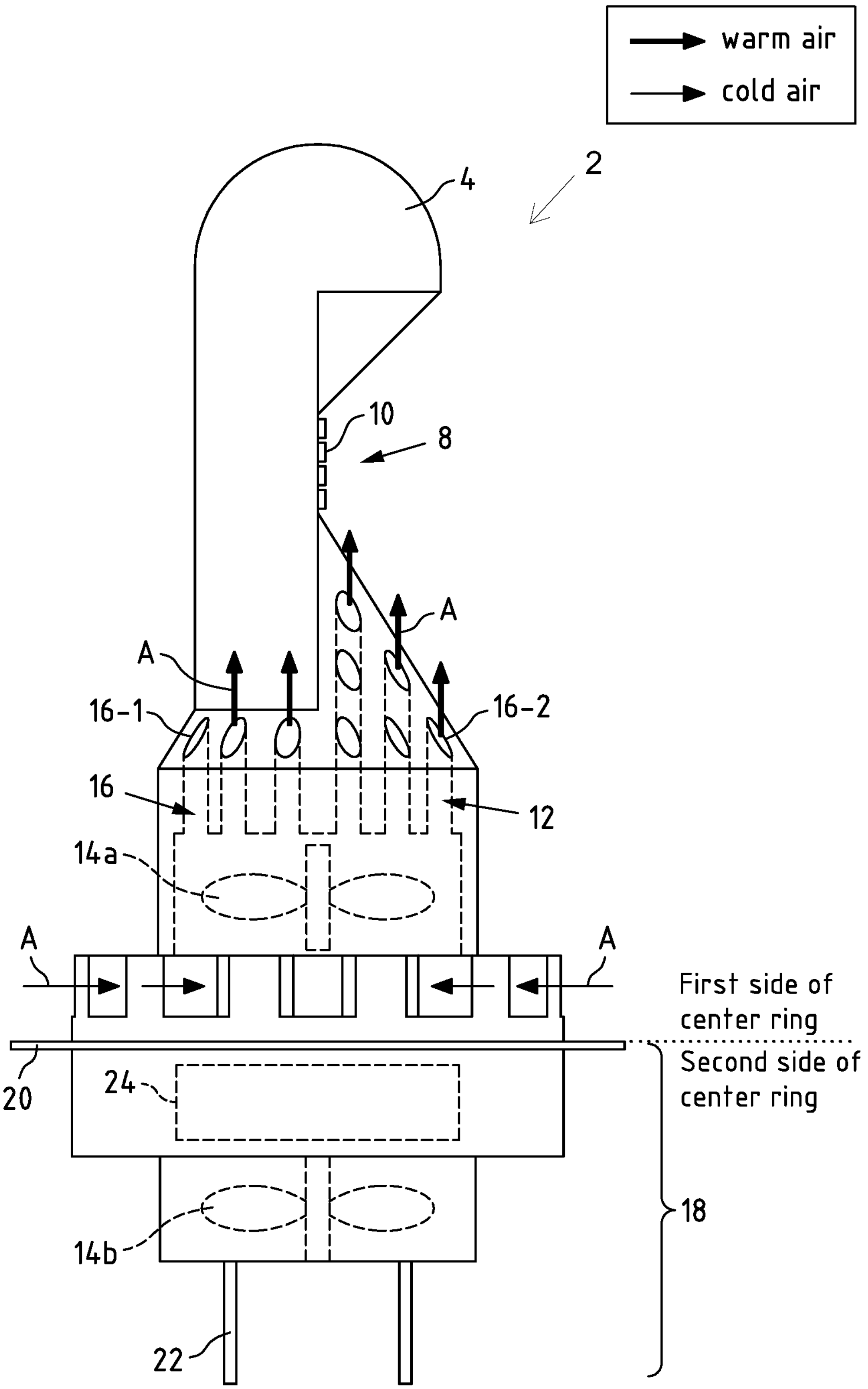
FIG. 2 is a schematic cross sectional view of another example lighting device.

FIG. 2 is a schematic cross sectional view of another example lighting device 2. The heat sink 4 comprises a plurality (e.g., at least two) air channels 16. Two of the air channels 16 are explicitly marked as 16-1 and 16-2 in FIG. 2 and which may be parts of the hollow structure 12. The air channels 16 may penetrate through the heat sink 4, such as below the mounting portion 8 of the lighting module 10. In comparison to the example lighting device 2 shown in FIG. 1A, the air flow A shown in FIG. 2 is directed such that air may be moved from the bottom of the heat sink 4 on top of the first side of the center ring 20 to a nose of the heat sink 4 shown at the top of FIG. 2. A first fan 14*a* (e.g., centrifugal fan) may be arranged between the mounting portion 8 and the center ring 20 on a first side of the heat sink 4. When the lighting device 2 is mounted in an automotive head lamp, the centrifugal fan 14*a* may still inside the optical element (e.g., reflector) of the automotive head lamp.

The at least one hollow structure may be formed tube-like, such as by the heat sink comprising one or more air channels in the heat sink. When air flows through such one or more (e.g., cooling) air channels, the heat resulting from the lighting module(s) can be transferred away through the one or more air channels. The heat can be transferred away very efficiently. The heat sink may comprise a plurality (e.g., at least two) of such air channels. The at least one fan may be arranged in such a way that the air flow resulting from operating the fan may move through the air channel(s). A respective air channel of the one or more air channels may have a round or rectangular shape, to name but a few non-limiting examples. The air flow through the air channel(s) may be directed towards a heat exchange surface, such as to one or more air elements, which may be cooling fins. In this way, a heat spreader may be enabled.

In some embodiments, the hollow structure may extend at least along the entire length of the lighting module mounting portion. Further, the hollow structure may extend along the entire length of the lighting device. In particular, the one or more air channels of the hollow structure may extend at least in part along the longitudinal direction of the lighting device. The one or more air channels may extend at least in part or along the entire length of the heat sink and through the heat sink. In this way, efficient cooling means for the heat sink are provided.

According to some embodiments, the at least one hollow structure alternatively or additionally may be surrounded by one or more cooling fins that are formed into the heat sink, wherein air of the air flow may be transferred by the at least one fan to the one or more cooling fins so that heat generated by the at least one lighting module may be transferred to an ambient surrounding of the heat sink. The cooling fins may extend from the surface of the heat sink. Thus, the at least one hollow structure may comprise or be represented by one or more air channels, be surrounded by one or more cooling fins, or comprise or be represented by one or more air channels and be surrounded by one or more cooling fins.

To enhance the efficiency of the cooling enabled by the lighting device according to the embodiments described herein, in addition to the hollow structure and the fan enabling air flow through the hollow structure, one or more (e.g., additional) cooling fins may be arranged in a position on the second side of the center ring. The additional cooling fin(s) may be arranged outside of an encapsulated automotive head lamp so that heat may be transferred from the inside of the automotive head lamp, where it is generated by the lighting module, to the outside of the automotive head lamp. In this way, heat may be dissipated away from an inside of an automotive appliance (e.g., automotive head lamp) when the lighting device is mounted to such an automotive appliance. Such one or more (e.g., additional) cooling fins may increase the total rate of heat transfer by increasing the surface size.

In the example illustrated in FIG. 2, the example lighting device 2 comprises a connecting portion 18 arranged below the center ring 20. The connecting portion 18 may include, for example, contact pins 22 and a center ring 20. The contact pins 22 may power, for example, an electric driver/motor 24, such as for operating the first fan 14*a* and/or a second fan 14*b*, which may be arranged below the center ring 20 on a second side of the center ring 20. The first fan 14*a* and the second fan 14*b* may together provide an increased air flow A, sucking in cold air near the center ring 20 and blowing out warm air through the air channels, such as the air channels marked by reference signs 16-1 and 16-2.

According to some embodiments, the connecting portion may be for electrically coupling the lighting device with a corresponding socket, for example of an automotive head lamp. The socket may, for instance, be provided by or be a part of the optical element. For instance, the optical element may be an automotive head lamp providing the socket. Electrical coupling between the socket and the connecting portion may be enabled via one or more contact pins that may be a part of the connecting portion of the lighting device. The socket may correspond to the one or more contact pins so that the contact pins can be electrically coupled to the socket. For instance, the connecting portion of the lighting device may comprise one or more plugs to be inserted into one or more corresponding sockets of the automotive head lamp. Via this electrical coupling, the lighting device may receive power, such as to operate the at least one lighting module and/or the fan. Further, a center ring of the connecting portion may mechanically connect with a corresponding element of the socket of the automotive head lamp.

Further, the contact pins may be shaped in such a way that, when the contact pins are coupled to the socket, the lighting device may be mechanically fastened in its position. In particular, the contact pins may be arranged in such a way that when the lighting device is mounted to the socket of the optical element, the lighting device may be referenced to the optical element in a pre-defined way, in particular so that light emitted by the lighting module(s) is emitted towards the optical element in a desired, thus pre-defined way, such as mimicking the emittance of light of a halogen lamp pendant of the lighting device.

The connecting portion and the lighting module mounting portion may be separated by the center ring. Thus, electric coupling elements (e.g., electric contacts or pins) as the one or more contact pins of the connecting portion may extend beyond the center ring to the second side of the center ring.

The at least one lighting module mounting portion 8 may be configured for receiving and/or being connected with the at least one lighting module 2. The lighting module mounting portion may, for instance, be an opening, a cavity or a recess in the heat sink in which at least one lighting module can be placed or is placed. For instance, the at least one lighting module can be arranged or mounted to the heat sink in the lighting module mounting portion. This can insure that the at least one lighting module is accurately positioned on the heat sink, and additionally, in relation to the connecting portion. The lighting module mounting portion may have the same longitudinal extension as a halogen filament. In this way, the lighting device may be enabled to mimic the light emitted by a corresponding halogen lamp pendant at least by being positioned in the same location. The lighting module mounting portion, in particular, may be located at the same distance from the center ring of the lighting device as it is of a corresponding halogen lamp pendant.

The first side of the center ring, as used herein, may refer to one or more components (such as the at least one lighting module) of the lighting device being arranged, for example, within an automotive appliance (e.g., automotive head lamp) when the lighting device is mounted to such an automotive appliance. The second side of the center ring, as used herein, may refer to one or more components of the lighting device arranged, for example, outside of an automotive appliance when the lighting device is mounted to such an automotive appliance. The center ring may represent the border between components being inside of such an automotive appliance and components being outside of an automotive appliance when the lighting device is mounted to such an automotive appliance. The border may be located at the upper end of the center ring when the lighting device is viewed as being positioned in a vertical position with its lighting module, if comprised, being located at the top region, and the first side of the center ring being on top on the second side of the center ring.

The connecting portion may comprise an electrical connection to be coupled with a corresponding socket provided by an automotive head lamp. The connecting portion may represent the part of the lighting device being located on the opposite end of the lighting device in comparison to the lighting module mounting portion being configured so that the lighting module can be arranged and/or connected to the lighting module mounting portion. The connecting portion may have the same form or outer shape as a halogen lamp pendant enabling the lighting device to fit in a respective socket of an automotive head lamp. Thus, the connecting portion of the lighting device may be formed in such a way that the lighting device fits into an automotive head lamp socket. Alternatively, the connecting portion may be formed to fit into a plurality (e.g. at least two) of automotive head lamp sockets. The connecting portion may be angled. One or more electrical connectors may be comprised by the connecting portion. The one or more electrical connectors may be used to drive electric power to the at least one lighting module and/or the at least one fan, and/or a motor (e.g. an electrical motor) of the fan. The lighting device may for instance fit in the same space as a corresponding halogen lamp pendant, such as for an automotive head lamp.

The connecting portion may be connected to a socket, which may be a part of an automotive appliance (e.g., automotive head lamp). The socket may provide means enabling to mount the lighting device according to all exemplary aspects at least temporarily to the socket.

The at least one lighting module may be arranged, for example, by connecting it with the at least one heat sink, in particular thermally. The lighting module may, for instance, be or comprise a single LED die or multiple (e.g., at least two) LED dies, or it may be or comprise an LED unit, as described above. An LED unit may comprise at least one semiconductor element, such as a p-n-junction, a diode, a transistor, and/or an interposer halogen (Ha) resistor. In embodiments, it may comprise at least one LED die, such as two, three, or more LED dies. Such a LED unit may, for instance, be arranged or attached (e.g., mounted) directly to the at least one heat sink. The at least one lighting module may be configured to emit light towards a light-emitting side of the lighting device. The light-emitting side may represent one or more areas of or around the lighting device, wherein an object that is to be illuminated by the lighting device may be brought to the light-emitting side for illumination. The lighting module mounting portion may provide a limited amount of space for the at least one lighting module. Thus, the at least one lighting module being arranged or attached to the lighting module mounting portion may be very small. The at least one lighting module may further emit light of at least the same intensity as a halogen filament of a corresponding halogen lamp pendant, which may be mimicked by the lighting device according to all exemplary aspects.

According to some embodiments, the at least one fan is positioned on the first side and/or the second side of the center ring. As described above, the fan, when operated, may enable to dissipate heat away, such as away from the lighting module mounting portion (e.g., to the second side of the center ring). This second side of the center ring may be outside of an optical element (e.g., an automotive head lamp) when the lighting device is mounted to or in such an optical element respectively automotive appliance. Additionally, in case of two or more fans, or alternatively, in case of a single fan arranged on the first side or the second side of the center ring, at least one fan may be on the second side of the center ring. In the case of a single fan, this fan may be mounted on the second side of the center ring to enable transferring of heat to the outside of an optical element when the lighting device is mounted to or in such an optical element respectively automotive appliance.

According to some embodiments, the at least one fan may be a radial fan or an axial fan. A radial fan, also referred to as centrifugal fan, may deal with a higher pressure loss for a given air volume flow. In contrast to an axial fan, the volume transferred by the radial fan may be lower. Such a radial fan may enable to move air perpendicularly from the intake of the fan to an output of the fan. Thus, the air flow may be redirected by typically 90° in a radial fan. The axial fan may, in contrast, enable to move air in a direction basically corresponding to the direction of the intake to its output. Such an axial fan may be arranged on the second side of the center ring. Then, it may be enabled to transfer heat from the inside of an automotive appliance to the outside, for example, of an automotive head lamp representing the optical element. Then, the heat of the air can be transferred to an ambient surrounding respectively periphery of the lighting device.

According to some embodiments, the components of the lighting device on the first side of the center ring may be located internally of the optical element when the lighting device is mounted to the optical element so that the (e.g., cooling) air flow circulates within the optical element.

The components of the lighting device on the first side of the center ring may be the heat sink, the housing part, the lighting module mounting portion, the lighting module, the hollow structure or a part of it, fan(s) if it (they) is (are) arranged on the first side of the center ring, the heat exchange surface, or a combination thereof. The components of the lighting device on the second side of the center ring may be the center ring, the connecting portion, contact pins, fan(s) if it (they) is (are) arranged on the second side of the center ring, and an electric driver or electric motor if used via a drive shaft to drive the fan(s) (arranged on the first and/or second side of the center ring), or a combination thereof. Thus, the center ring may be a part of the connecting portion, both of which are located on the second side of the center ring.

In some embodiments, a second fan or rotor may increase the air flow speed and thus yield a higher heat transfer rate.

For instance, the at least two fans may have a common axis through the heat sink, such as a so-called 2-stage fan. This may have the advantage that only on one side (e.g., at the second side of the center ring) a single electrical motor may be needed to rotate the blades of the at least two fans, as described herein. No further electrical wiring may be needed for the other fan. Also, less weight on the top of the heat sink may result due to absence of an electric motor that is a part of the fan. This may lead, for example, to less mechanical resonances when the at least two fans are operated. Further, the shape of rotors of the fans may be adjusted, for example, to an available space and/or different air densities due to the different temperatures.

According to some embodiments, the components of the lighting device located on the first side of the center ring may be hermetically sealed with respect to a fluid volume on the second side of the center ring when the lighting device is mounted to the optical element. This may enable to save on, for example, fan protection, as, for example, dust in particular can no longer penetrate into the hermetically sealed inside to the components on the first side of the center ring from the outside (second side of the center ring). The components of the lighting device on the first side (e.g., above the center ring) may be located inside of such a hermetically sealed area when the lighting device is mounted respectively installed to the optical element (e.g., automotive head lamp). In case a fan is arranged on the first side of the center ring, it may, for instance, enable a closed air flow system (e.g., preventing that humidity is sucked into the optical element (e.g., automotive head lamp)) when the fan is operated, to name but one non-limiting example. The second side of the center ring may be located outside of the optical element and may have a connection to a fluid or gaseous volume (e.g., the ambient surrounding) outside of the optical element when the lighting device is mounted installed.

Figure 5:
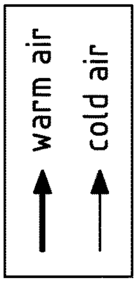
FIG. 3, FIG. 4 and FIG. 5 are schematic views of other example lighting devices.
Figure 5:
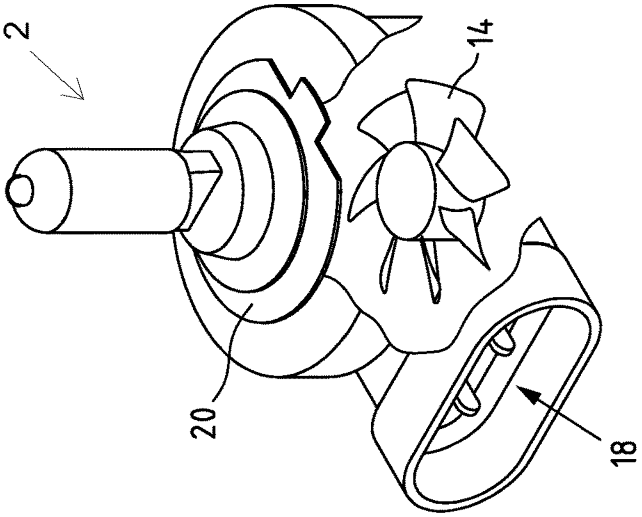
Figure 4:
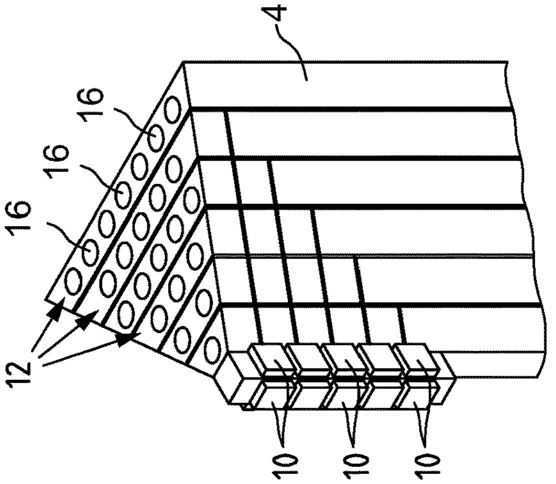
Figure 3:
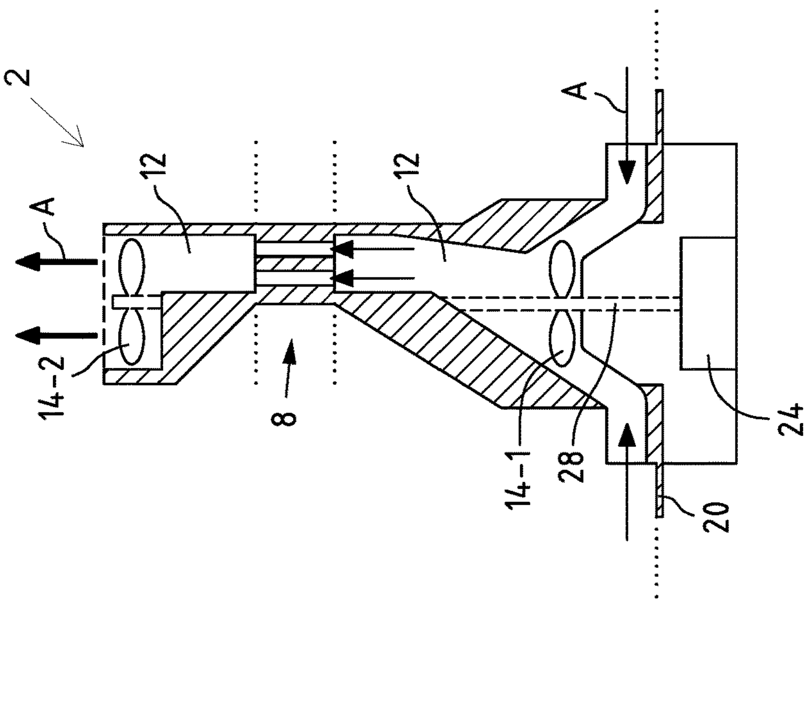

FIG. 3, FIG. 4 and FIG. 5 are schematic views of other example lighting devices 2. More specifically, FIG. 3 shows a fan 14-1, which may be a mini-fan, which may be placed above the center ring 20 and/or on top of the center ring 20. The dotted line at the bottom of FIG. 3 marks the position of the center ring 20. The two dotted lines shown in the upper part at the lighting module mounting portion 8 mark a position corresponding to the halogen filament 26 of the halogen lamp pendant shown in FIG. 10. The exemplary air flow A enabled by such a configuration of FIG. 3 is illustrated by the arrows. A top fan 14-2 may suck air out of the hollow structure 12, and a bottom fan 14-1 may blow air into the hollow structure 12. Of course, the lighting device 2 may be configured vice versa so that the top fan 14-2 blows air into the hollow structure 12 and the bottom fan 14-1 sucks air out of the hollow structure 12. Alternatively to the hollow structure 12, a single plurality of air channels, such as the air channels shown 16 in FIG. 2, may be used. The air flow A may be guided through the hollow structure 12 for efficient cooling. Alternatively, a single fan may be used, which can be arranged at the first side of the center ring 20, either blowing air into or sucking air out of the hollow structure 12.

In case two fans 14-1 and 14-2 are used and arranged as shown in FIG. 3, the two fans 14-1 and 14-2 may have a common axis through the heat sink 4. This may enable that an electric driver/motor 24 may only be needed one side (e.g., at the second side of the center ring 20) to drive the respective two fans 14-1 and 14-2 via a drive shaft 28, and the single electrical driver/motor 24 can rotate the blades of both fans 14-1 and 14-2. No further or dedicated electrical wiring for the second fan may be needed (e.g., for the top fan 14-2 in case the bottom fan 14-1 is directly connected with the electrical driver/motor 24). Also, less weight on one end (top) of the lighting device 2 may be present due to absence of a corresponding electrical driver/motor at the top. This may lead to less mechanical resonances when the fans 14-1 and 14-2 are operated. The shape of the fans 14-1 and 14-2 may be adjusted such that the top fan sucks cold air in or blows out warm air while the bottom fan 14-1 blows out warm air or sucks in cold air, to name but a few non-limiting examples.

FIG. 4 shows a V-shaped nose of a heat sink 4 comprising a plurality of cooling pipes 12 as air channels 16 penetrating the V-shaped heat sink nose. Also, a plurality of lighting modules 10 are at least thermally connected to the V-shaped heat sink nose. In the example embodiment shown in FIG. 5, a fan 14 may is arranged in a housing located on the second side of the center ring 20 in the connecting portion 18. Since the connection portion 18 is angled, a fan 14 with a bigger diameter may be used.

The one or more fans according to any of the embodiments described herein may be electrically powered. The at least one fan may be electrically coupled via the connecting portion to a power source. In this case, the fan may comprise a motor to drive it. Alternatively, the motor may be separated from the fan, and the fan may be driven via a drive shaft. Such a drive shaft may be connected to more than one (e.g., at least two) fans, so that more than one fan can be driven by a single motor. The fan or fans, when powered, may enable to create an air flow, such as through the at least one hollow structure of the lighting device. The air flow may suck cold air into the hollow structure, wherein heat may be transferred to the air flow so that it heats up. Then, the warm air of the air flow may be blown out of the hollow structure, or over, for example, one or more cooling fins. The hollow structure may be surrounded by one or more cooling fins. The fan may comprise rotating elements, such as one or more vanes or blades, to name but a few non-limiting examples.

Figure 6:
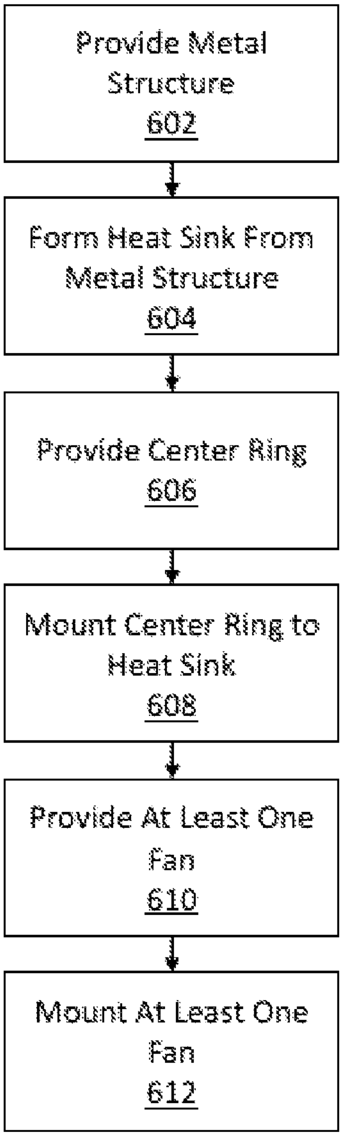
FIG. 6 is a flow diagram of an example method of manufacturing a lighting device.

FIG. 6 is a flow diagram of an example method of manufacturing a lighting device, such as the lighting device 2 of FIGS. 1A, 1B, 2, 3, 4 and/or 5. In the example illustrated in FIG. 6, the method includes providing a metal structure (602) and forming, from the metal structure, a heat sink (604). The heat sink may include a lighting module mounting part configured for connection with at least one lighting module and at least one hollow structure within the heat sink. A center ring may be provided (606). The center ring may have a first side and a second side opposite the first side. The center ring may also have a mechanical interface configured for mechanically coupling the center ring to the optical element. The center ring may be mounted to the heat sink (608). The center ring may be mounted to the heat sink so that the at least one hollow structure is positioned entirely over the first side of the center ring. At least one fan may be provided (610). The at least one fan may include at least one blade and a driver. The at least one fan may be mounted (612). The at least one fan may be mounted so that at least a portion of the at least one fan is contained within the at least one housing part with the at least one blade disposed within the at least one hollow structure.

In some embodiments, the at least one hollow structure may be formed using CNC cutting, die casting or by joining at least two sub-elements of the metal structure into the heat sink. In this way, the heat sink comprising the at least one hollow structure may be formed. For example, a metal structure to be formed into the heat sink may be formed by using CNC or laser cutting, die casting, or by forming two or more sub-elements (e.g., by stamping) separately, and then joining (e.g., merging or combining) the two or more sub-elements together, such as using screws or rivets, or by gluing or welding the two or more sub-elements together.

The lighting module may be intended for use in an automotive appliance requiring intense bright light, such as an automotive head light or lamp or an automotive back light or lamp. In this case, a high amount of heat power may be produced when generating light so that the lighting module may reach temperatures of 135° C. or more during operation, potentially damaging the lighting module. At least a part of this heat may flow and/or be dissipated away from the lighting module by means of a thermal connection to the heat sink. For instance, the lighting module may be mounted. Such as by gluing and/or clamping on the heat sink using a thermally conductive material in between such as a thermal paste, thermal glue or thermal pad. Alternatively, the lighting module may be soldered to the heat sink. The lighting module mounting portion may further be a lead frame. The lighting module may also be mounted on or to such a lead frame, in particular be mounted by soldering it to the lead frame.

The lighting device may, for instance, be a retrofit H7 or H11 lighting device. Thus, the lighting device can fit or is compatible with automotive lighting devices for H7 or H11 sockets.

In some embodiments, the method may also include encapsulating the at least one hollow structure and the at least one fan. As described above, by arranging the connection portion on the second side of the center ring, and outside of the optical element when the lighting device is mounted to or installed to the optical element, it may be enabled to create a circulation of air flow within the automotive appliance (e.g., automotive head lamp). This may enable the technical effect that no air, such as humid air from the outside of the automotive head lamp, may be sucked into the automotive head lamp, which may result in condensation within the automotive head lamp. The air flow created by the fan may be based on air within the automotive head lamp only. For instance, humidity can be kept out of the automotive head lamp when the lighting device is mounted in such an automotive head lamp.

Figure 7:
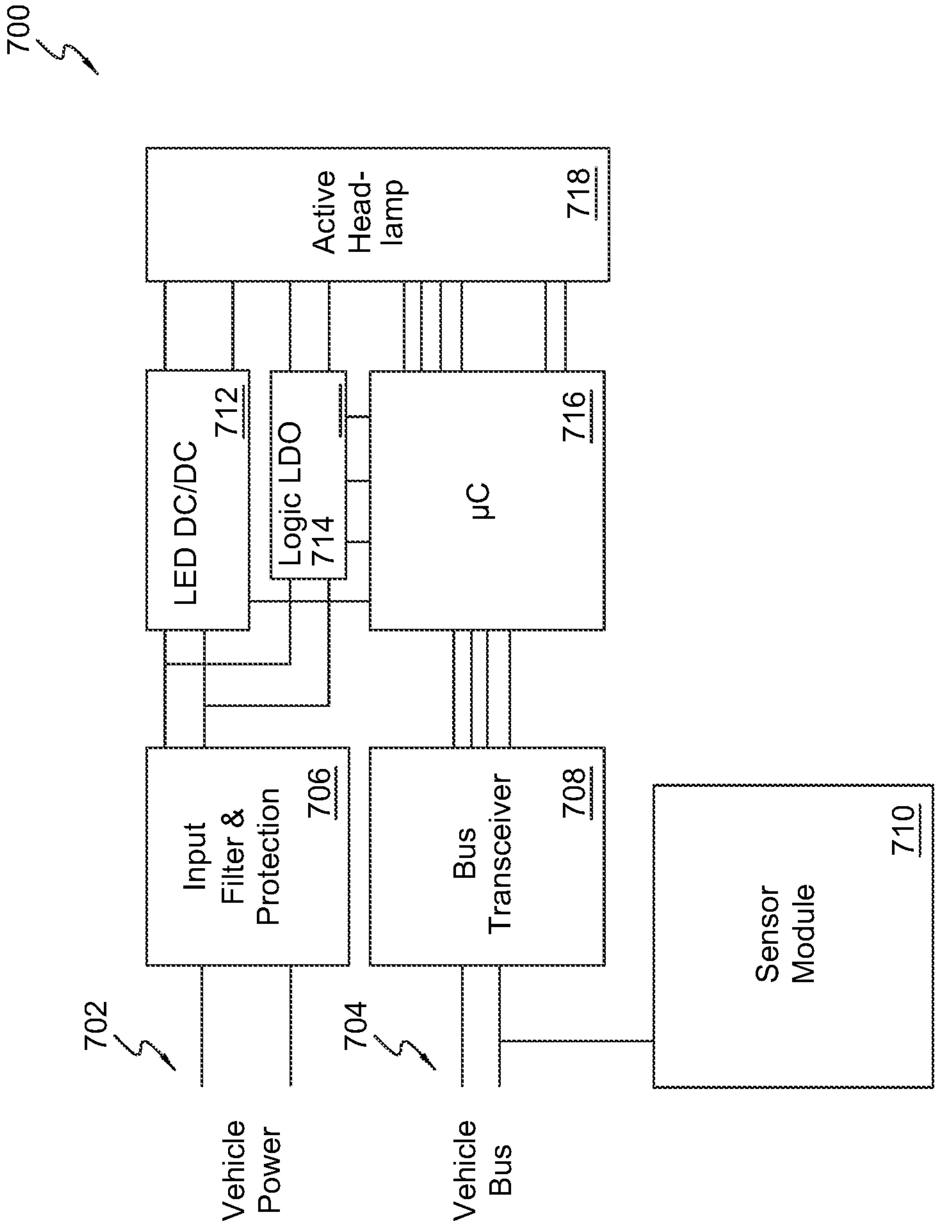
FIG. 7 is a diagram of an example vehicle headlamp system.

FIG. 7 is a diagram of an example vehicle headlamp system 700 that may incorporate one or more of the embodiments and examples described herein. The example vehicle headlamp system 700 illustrated in FIG. 7 includes power lines 702, a data bus 704, an input filter and protection module 706, a bus transceiver 708, a sensor module 710, an LED direct current to direct current (DC/DC) module 712, a logic low-dropout (LDO) module 714, a micro-controller 716 and an active head lamp 718.

The power lines 702 may have inputs that receive power from a vehicle, and the data bus 704 may have inputs/outputs over which data may be exchanged between the vehicle and the vehicle headlamp system 700. For example, the vehicle headlamp system 700 may receive instructions from other locations in the vehicle, such as instructions to turn on turn signaling or turn on headlamps, and may send feedback to other locations in the vehicle if desired. The sensor module 710 may be communicatively coupled to the data bus 704 and may provide additional data to the vehicle headlamp system 700 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 700. In FIG. 7, the headlamp controller may be a micro-controller, such as micro-controller (pc) 716. The micro-controller 716 may be communicatively coupled to the data bus 704.

The input filter and protection module 706 may be electrically coupled to the power lines 702 and may, for example, support various filters to reduce conducted emissions and provide power immunity. Additionally, the input filter and protection module 706 may provide electrostatic discharge (ESD) protection, load-dump protection, alternator field decay protection, and/or reverse polarity protection.

The LED DC/DC module 712 may be coupled between the input filter and protection module 106 and the active headlamp 718 to receive filtered power and provide a drive current to power LEDs in the LED array in the active headlamp 718. The LED DC/DC module 712 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 714 may be coupled to the input filter and protection module 706 to receive the filtered power. The logic LDO module 714 may also be coupled to the micro-controller 716 and the active headlamp 718 to provide power to the micro-controller 716 and/or electronics in the active headlamp 718, such as CMOS logic.

The bus transceiver 708 may have, for example, a universal asynchronous receiver transmitter (UART) or serial peripheral interface (SPI) interface and may be coupled to the micro-controller 716. The micro-controller 716 may translate vehicle input based on, or including, data from the sensor module 710. The translated vehicle input may include a video signal that is transferrable to an image buffer in the active headlamp 718. In addition, the micro-controller 716 may load default image frames and test for open/short pixels during startup. In embodiments, an SPI interface may load an image buffer in CMOS. Image frames may be full frame, differential or partial frames. Other features of micro-controller 716 may include control interface monitoring of CMOS status, including die temperature, as well as logic LDO output. In embodiments, LED DC/DC output may be dynamically controlled to minimize headroom. In addition to providing image frame data, other headlamp functions, such as complementary use in conjunction with side marker or turn signal lights, and/or activation of daytime running lights, may also be controlled.

Figure 8:
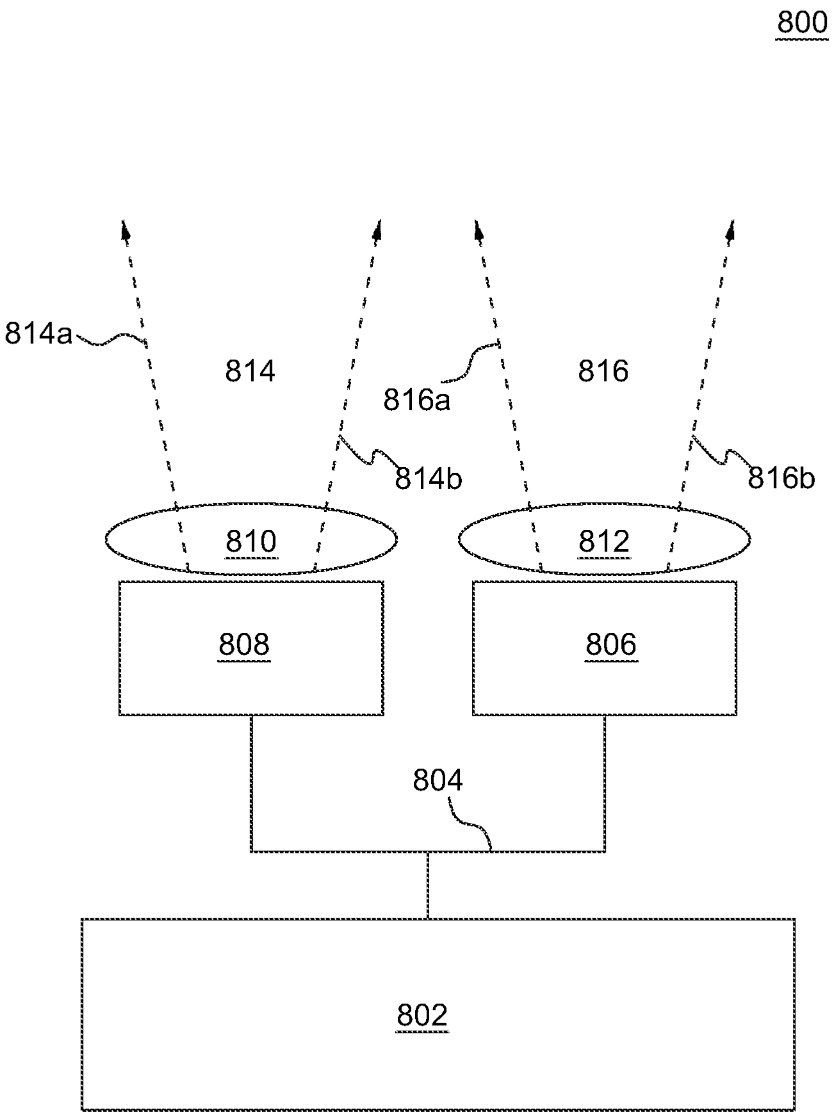
FIG. 8 is a diagram of another example vehicle headlamp system.

FIG. 8 is a diagram of another example vehicle headlamp system 800. The example vehicle headlamp system 800 illustrated in FIG. 8 includes an application platform 802, two LED lighting systems 806 and 808, and secondary optics 810 and 812.

The LED lighting system 808 may emit light beams 814 (shown between arrows 814*a* and 814*b* in FIG. 8). The LED lighting system 806 may emit light beams 816 (shown between arrows 816*a* and 816*b* in FIG. 8). In the embodiment shown in FIG. 8, a secondary optic 810 is adjacent the LED lighting system 808, and the light emitted from the LED lighting system 808 passes through the secondary optic 810. Similarly, a secondary optic 812 is adjacent the LED lighting system 806, and the light emitted from the LED lighting system 806 passes through the secondary optic 812. In alternative embodiments, no secondary optics 810/812 are provided in the vehicle headlamp system.

Where included, the secondary optics 810/812 may be or include one or more light guides. The one or more light guides may be edge lit or may have an interior opening that defines an interior edge of the light guide. LED lighting systems 808 and 806 may be inserted in the interior openings of the one or more light guides such that they inject light into the interior edge (interior opening light guide) or exterior edge (edge lit light guide) of the one or more light guides. In embodiments, the one or more light guides may shape the light emitted by the LED lighting systems 808 and 806 in a desired manner, such as, for example, with a gradient, a chamfered distribution, a narrow distribution, a wide distribution, or an angular distribution.

The application platform 802 may provide power and/or data to the LED lighting systems 806 and/or 808 via lines 804, which may include one or more or a portion of the power lines 702 and the data bus 704 of FIG. 7. One or more sensors (which may be the sensors in the vehicle headlamp system 800 or other additional sensors) may be internal or external to the housing of the application platform 802. Alternatively, or in addition, as shown in the example vehicle headlamp system 700 of FIG. 7, each LED lighting system 808 and 806 may include its own sensor module, connectivity and control module, power module, and/or LED array.

In embodiments, the vehicle headlamp system 800 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within LED lighting systems 806 and 808 may be sensors (e.g., similar to sensors in the sensor module 710 of FIG. 7) that identify portions of a scene (e.g., roadway or pedestrian crossing) that require illumination.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. A lighting device for mounting to an optical element, the lighting device comprising:

a center ring having a first side and a second side opposite the first side, the center ring comprising a mechanical interface configured for mechanically coupling the center ring to the optical element;

a heat sink comprising a lighting module mounting part configured for connection with at least one lighting module and at least one hollow structure within the heat sink, the heat sink being positioned relative to the center ring with the entire at least one hollow structure positioned over the first side of the center ring;

at least one housing part; and at least one fan comprising at least one blade and a driver, at least a portion of the at least one fan contained within the at least one housing part with the at least one blade disposed within the at least one hollow structure.

2. The lighting device of claim 1, wherein the driver is contained within the at least one housing part.

3. The lighting device of claim 1, wherein the at least one housing part is part of the heat sink.

4. The lighting device of claim 1, wherein the at least one fan is arranged in relation to the at least one hollow structure so that the air flows through the at least one hollow structure and enables heat exchange between environmental air and a surface of the heat sink when the at least one fan is operated.

5. The lighting device of claim 1, wherein the at least one hollow structure enables an air flow through the at least one hollow structure.

6. The lighting device according to claim 1, wherein the at least one housing part is positioned on the first side of the center ring or on the second side of the center ring.

7. The lighting device according to claim 1, wherein the at least one hollow structure is surrounded by one or more cooling fins, wherein air is transferred by the at least one fan to the one or more cooling fins so that heat generated by the at least one lighting module is transferred to an ambient surrounding of the heat sink.

8. The lighting device according to claim 7, wherein the at least one hollow structure further comprises one or more air channels enabling the air flow through the one or more air channels to the one or more cooling fins.

9. The lighting device according to claim 1, wherein the at least one hollow structure extends at least in part along a longitudinal direction of the lighting device.

10. The lighting device according to claim 1, wherein the at least one fan is a radial or an axial fan.

11. The lighting device according to claim 1, wherein the lighting device further comprises at least one connecting part configured to electrically couple the lighting device with a corresponding socket.

12. The lighting device according to claim 1, further comprising another fan arranged on the first side of the center ring so that the lighting module mounting part is located between the other fan and the center ring, increasing air flow through the at least one hollow structure when the at least one fan and the other fan are operated.

13. A method of manufacturing a lighting device, the method comprising:

providing a metal structure;

forming, from the metal structure, a heat sink that comprises a lighting module mounting part configured for connection with at least one lighting module and at least one hollow structure within the heat sink;

providing a center ring having a first side and a second side opposite the first side, the center ring comprising a mechanical interface configured for mechanically coupling the center ring to the optical element;

mounting the center ring to the heat sink so that the at least one hollow structure is positioned entirely over the first side of the center ring;

providing the at least one fan comprising at least one blade and a driver; and mounting the at least one fan so that at least a portion of the at least one fan is contained within the at least one housing part with the at least one blade disposed within the at least one hollow structure.

14. The method of claim 13, further comprising forming the hollow structure in the heat sink by one of CNC cutting, die casting or joining at least two sub-elements of the metal structure into the heat sink.

15. The method of claim 13, further comprising encapsulating the at least one hollow structure and the at least one fan.

16. An automotive lighting device comprising:

an optical element comprising a socket; and a lighting device comprising:

a center ring having a first side and a second side opposite the first side, the center ring comprising a mechanical interface configured for mechanically coupling the center ring to the optical element, a heat sink comprising a lighting module mounting part configured for connection with at least one lighting module and at least one hollow structure within the heat sink, at least one housing part, and at least one fan comprising at least one blade and a driver, at least a portion of the at least one fan contained within the at least one housing part with the at least one blade disposed within the at least one hollow structure, the lighting device mounted in the socket in the optical element via at least the center ring with all components of the light device disposed within the optical element.

17. The automotive light device of claim 16, wherein the heat sink being positioned relative to the center ring with the entire at least one hollow structure positioned over the first side of the center ring.

18. The automotive lighting device of claim 16, wherein the automotive lighting device is one of a head lamp and a rear lamp.

* * * * *